United States Patent
Kazmi et al.

(10) Patent No.: US 8,750,808 B2
(45) Date of Patent: Jun. 10, 2014

(54) CONFIGURATION OF REFERENCE SIGNAL TRANSMISSION BANDWIDTH

(75) Inventors: Muhammad Kazmi, Bromma (SE); Iana Siomina, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 13/395,919

(22) PCT Filed: Jan. 12, 2012

(86) PCT No.: PCT/SE2012/050019
§ 371 (c)(1),
(2), (4) Date: Mar. 14, 2012

(87) PCT Pub. No.: WO2012/112101
PCT Pub. Date: Aug. 23, 2012

(65) Prior Publication Data
US 2012/0276916 A1    Nov. 1, 2012

Related U.S. Application Data

(60) Provisional application No. 61/443,120, filed on Feb. 15, 2011.

(51) Int. Cl.
*H04B 17/00* (2006.01)
*H04W 72/08* (2009.01)
*H04W 72/12* (2009.01)

(52) U.S. Cl.
CPC ............ *H04W 72/082* (2013.01); *H04W 72/12* (2013.01)
USPC ..................... 455/67.13; 455/63.3; 455/452.1; 455/452.2

(58) Field of Classification Search
CPC . H04W 72/0493; H04W 72/08; H04W 72/06; H04W 72/082; H04W 72/085; H04W 72/12; H04W 72/0486
USPC ........ 455/452.1, 452.2, 443, 444, 501, 67.13, 455/62, 63.1, 67.3, 114.2; 370/252, 310.2, 370/330, 332, 333
See application file for complete search history.

(56) References Cited

U.S. PATENT DOCUMENTS

2010/0271965 A1    10/2010    Siomina et al.

FOREIGN PATENT DOCUMENTS

| WO | 2008097185 A2 | 8/2008 |
| WO | 2008118064 A2 | 10/2008 |
| WO | 2009057729 A2 | 5/2009 |
| WO | 2010126419 A1 | 11/2010 |

OTHER PUBLICATIONS

3RD Generation Partnership Project. "Physical-Layer Parameters to be Configured by RRC." 3GPP TSG-RAN WG1 #51bis, R1-080621, Sevilla, Spain, Jan. 14-18, 2008.
3RD Generation Partnership Project. "System Configuration of OTDOA." 3GPP TSG RAN WG1 #57, R1-092142, San Francisco, California, May 4-8, 2009.

*Primary Examiner* — Jean Gelin
(74) *Attorney, Agent, or Firm* — Coats & Bennett, PLLC

(57) ABSTRACT

Processing implemented by a method and apparatus herein advantageously addresses degradations to the quality of reference signal measurements and/or to the quality of serving cell data reception that would otherwise result from a wireless device (36) measuring different cells' reference signals over different bandwidths. The processing addresses these potential degradations by intelligently configuring the bandwidth over which different cells actually transmit reference signals. In this regard, the processing includes identifying (100) the cell bandwidth of each cell in a set of cells that transmit reference signals likely to be measured during a given measurement session of a wireless device (36). Processing then entails selecting (110), as a function of the cell bandwidths, a reference-signal bandwidth over which reference signals are to be transmitted from at least a subset of the cells in the set. Finally, processing includes configuring (120) at least each cell in the subset to transmit reference signals over said reference-signal bandwidth.

58 Claims, 7 Drawing Sheets

```
--ASN1START

OTDOA-ProvideAssistanceData ::= SEQUENCE {
    otdoa-ReferenceCellInfo      OTDOA-ReferenceCellInfo        OPTIONAL,
    otdoa-NeighbourCellInfo      OTDOA-NeighbourCellInfoList    OPTIONAL,
    otdoa-Error                  OTDOA-Error                    OPTIONAL,
    ...
}

--ASN1STOP
```

*FIG. 2*
*(PRIOR ART)*

CONFIGURATION OF REFERENCE SIGNAL TRANSMISSION BANDWIDTH

TECHNICAL FIELD

The present invention generally relates to controlling the configuration of reference signals for transmission from cells in a wireless communication system, and particularly relates to configuring the bandwidth over which those signals are to be transmitted, as a function of the cell bandwidth of the cells.

BACKGROUND

The availability of several techniques and devices for identifying the geographical location of mobile device users has enabled a large variety of commercial and non-commercial services, such as navigation assistance, enhanced social networking, location-aware advertising, and location-aware emergency calls. However, different services may have different positioning accuracy requirements imposed by the application. In addition, some regulatory requirements on the positioning accuracy for basic emergency services exist in some countries, such as the FCC's E-911-related requirements in the United States.

In many environments, the position of a mobile device user can be accurately estimated by using positioning methods based on GPS (Global Positioning System) or other satellite-based system. Nowadays, wireless networks are often able to provide positioning-related assistance to mobile terminals (often referred to as user equipment, or UEs, or wireless terminals, mobile stations, or simply "mobiles") to improve the terminal's receiver sensitivity and GPS start-up performance. Several of these techniques are known as Assisted-GPS positioning, or A-GPS.

GPS or A-GPS receivers may not be available in all UE, however. Furthermore, GPS is known to fail in certain indoor environments and in urban "canyons" in the radio shadows caused by tall buildings. Complementary terrestrial positioning methods, such as one approach called Observed Time-Difference-of-Arrival (OTDOA), have therefore been standardized by the 3rd-Generation Partnership Project (3GPP) and are deployed in various wireless networks. In addition to OTDOA, the 3GPP standards for the so-called Long-Term Evolution (LTE) wireless system also specify methods, procedures and signalling support for techniques called Enhanced Cell ID (E-CID) and Assisted Global Navigation Satellite System (A-GNSS). Later, a network-based technique called Uplink Time-Difference-of-Arrival (UTDOA) may also be standardized for LTE.

Three key network elements for providing location services (LCS) in an LTE positioning architecture include the LCS Client, the LCS target and the LCS Server. The LCS Server is a physical or logical entity managing positioning for a LCS target device by collecting measurements and other location information, assisting the terminal in measurements when necessary, and estimating the LCS target location. A LCS Client is a software and/or hardware entity that interacts with a LCS Server for the purpose of obtaining location information for one or more LCS targets, i.e. the entities being positioned. LCS Clients may reside in the LCS targets themselves. An LCS Client sends a request to LCS Server to obtain location information, and LCS Server processes and serves the received requests and sends the positioning result and optionally a velocity estimate to the LCS Client.

Position calculation can be conducted, for example, by a UE or by a positioning server, such as an Enhanced Serving Mobile Location Center, E-SMLC, or Secure User Plan Location (SUPL) Location Platform (SLP) in LTE. The former approach corresponds to the UE-based positioning mode, whilst the latter corresponds to the UE-assisted positioning mode.

Two positioning protocols operating via the radio network exist in LTE, LTE Positioning Protocol (LPP) and LPP Annex (LPPa). The LPP is a point-to-point protocol between a LCS Server and a LCS target device, used in order to position the target device. LPP can be used both in the user and control plane, and multiple LPP procedures are allowed in series and/or in parallel thereby reducing latency. LPPa is a protocol between evolved Node B (eNodeB) and LCS Server specified only for control-plane positioning procedures, although it still can assist user-plane positioning by querying eNodeBs for information and eNodeB measurements. SUPL protocol is used as a transport for LPP in the user plane. LPP has also a possibility to convey LPP extension messages inside LPP messages, e.g. currently Open Mobile Alliance (OMA) LPP extensions are being specified (LPPe) to allow e.g. for operator-specific assistance data or assistance data that cannot be provided with LPP or to support other position reporting formats or new positioning methods.

A high-level architecture of such an LTE system 10 is illustrated in FIG. 1. In FIG. 1, the system 10 includes a UE 12, a radio access network (RAN) 14, and a core network 16. The UE 12 comprises the LCS target. The core network 16 includes an E-SMLC 18 and/or an SLP 20, either of which may comprise the LCS Server. The control plane positioning protocols with the E-SMLC 14 as the terminating point include LPP, LPPa, and LCS-AP. The user plane positioning protocols with the SLP 16 as the terminating point include SUPL/LPP and SUPL. Although note shown, the SLP 20 may comprise two components, a SUPL Positioning Center (SPC) and a SUPL Location Center (SLC), which may also reside in different nodes. In an example implementation, the SPC has a proprietary interface with E-SMLC, and an Llp interface with the SLC. The SLC part of the SLP communicates with a P-GW (PDN-Gateway) 22 and an External LCS Client 24.

Additional positioning architecture elements may also be deployed to further enhance performance of specific positioning methods. For example, deploying radio beacons 26 is a cost-efficient solution which may significantly improve positioning performance indoors and also outdoors by allowing more accurate positioning, for example, with proximity location techniques.

To meet varying demands for different Location-Based Services (LBS), an LTE network will deploy a range of complementing methods characterized by different performance in different environments. Depending on where the measurements are conducted and where the final position is calculated, the methods can be UE-based, UE-assisted, or network-based, each with own advantages. The following methods are available in the LTE standard for both the control plane and the user plane: (1) Cell ID (CID), (2) UE-assisted and network-based E-CID, including network-based angle of arrival (AoA), (3) UE-based and UE-assisted A-GNSS (including A-GPS), and (4) UE-assisted OTDOA.

Several other techniques such as hybrid positioning, fingerprinting positioning and adaptive E-CID (AECID) do not require additional standardization and are therefore also possible with LTE. Furthermore, there may also be UE-based versions of the methods above, e.g. UE-based GNSS (e.g. GPS) or UE-based OTDOA, etc. There may also be some alternative positioning methods such as proximity based location. UTDOA may also be standardized in a later LTE release, since it is currently under discussion in 3GPP. Similar methods, which may have different names, also exist for radio-access technologies (RATs) other than LTE, such as CDMA, WCDMA or GSM.

With particular regard to the OTDOA positioning method, this method makes use of the measured timing of downlink signals received from multiple base stations (evolved NodeBs, or eNodeBs, in LTE) at the UE. The UE measures the timing of the received signals using assistance data received from the LCS server, and the resulting measurements are used to locate the UE in relation to the neighbouring eNodeBs.

More specifically, the UE measures the timing differences for downlink reference signals received from multiple distinct locations or neighboring cells. For each (measured) neighbor cell, the UE measures Reference Signal Time Difference (RSTD), which is a relative timing difference between the neighbor cell and a defined reference cell. The UE position estimate is then found as the intersection of hyperbolas corresponding to the measured RSTDs. At least three measurements from geographically dispersed base stations with a good geometry are needed to solve for two coordinates of the UE and the receiver clock bias. In order to solve for position, precise knowledge of the transmitter locations and transmit timing offset is needed.

To enable positioning in LTE and facilitate positioning measurements of a proper quality and for a sufficient number of distinct locations, new physical signals dedicated for positioning (positioning reference signals, or PRS) have been introduced and low-interference positioning subframes have been specified in 3GPP. Details are specified in 3GPP TS 36.211; as of February 2011, version 10.0.0 of this specification is available from http://www.3gpp.org.

PRS are transmitted from one antenna port of a base station according to a pre-defined pattern. A frequency shift, which is a function of Physical Cell Identity (PCI), can be applied to the specified PRS patterns to generate orthogonal patterns. The mapping of frequency shifts to PCT models an effective frequency reuse of six, which makes it possible to significantly reduce neighbor cell interference on the measured PRS and thus improve positioning measurements. Even though PRS have been specifically designed for positioning measurements and in general are characterized by better signal quality than other reference signals, the standard does not mandate using PRS. Other reference signals, e.g. cell-specific reference signals (CRS) could be used for positioning measurements, in principle.

PRS are transmitted in pre-defined positioning sub-frames grouped by several consecutive sub-frames ($N_{PRS}$), i.e., one positioning occasion. Positioning occasions occur periodically with a certain periodicity of N subframes, i.e. the time interval between two positioning occasions. The standardized periods N are 160, 320, 640, and 1280 ms, and the number of consecutive subframes may be 1, 2, 4, or 6 [3GPP TS 36.211]. PRS configuration and PRS offset from System Frame Number 0 (SFN0) are determined by a PRS configuration index defined in [3GPP 36.211] and signalled in the OTDOA assistance data. The number of consecutive DL subframes and the PRS bandwidth (which may be smaller than the system bandwidth) may also be signalled in the OTDOA assistance data. Of course, signaling the PRS bandwidth in the assistance data is only useful if RSTD measurements are performed on PRS (as opposed to other reference signals).

PRS may also be muted, e.g., not transmitted. The positioning node informs the UE about whether PRS is muted or not, e.g., by signalling a cell-specific muting pattern which indicates PRS positioning occasions in which the UE is expected to perform measurements for the corresponding cell.

Information about such PRS and other information that will assist with positioning measurements is included in so-called assistance data. Different sets of assistance data are typically used for different methods. Regardless, the positioning assistance data is sent by the positioning server, or via some other node, to UEs or other radio nodes in order to assist with positioning measurements. For example, assistance data may be sent via LPP to an eNodeB for transmission to the UE. In this case, the transmission of assistance data may be transparent to the eNodeB and the Mobility Management Entity (MME). The assistance data may also be sent by the eNodeB via LPPa to a positioning server for further transfer to the UE. In some cases, the assistance data may be sent on request from a wireless device that needs to perform measurements. In other cases, the assistance data is sent in an unsolicited way.

Since for OTDOA positioning PRS signals from multiple distinct locations need to be measured, the UE receiver may have to deal with PRS that are much weaker than those received from the serving cell. Furthermore, without an approximate knowledge of when the measured signals are expected to arrive in time and what is the exact PRS pattern, the UE must perform signal search within a large window. This can impact the time and accuracy of the measurements as well as the UE complexity. To facilitate UE measurements, the network transmits assistance data to the UE, which includes, among other things, reference cell information, a neighbour cell list containing Physical Cell Identifiers (PCIs) of neighbour cells, the number of consecutive downlink subframes within a positioning occasion, PRS transmission bandwidth, frequency, etc.

In LPP, the OTDOA assistance data is provided within the Information Element (IE) OTDOA-ProvideAssistanceData, as shown in FIG. 2. Similar structures for OTDOA exist in LPPe.

The OTDOA assistance data includes information about the reference cell and neighbour cells for which OTDOA is to be determined. The neighbour cells may or may not be on the same frequency as the reference cell, and the reference cell may or may not be on the same frequency as the serving cell, and may or may not be the serving cell. Measurements that involve cells on a frequency different than the serving cell are inter-frequency measurements. Measurements on the same frequency as the serving cell are intra-frequency measurements. Different requirements apply for intra- and inter-frequency measurements.

Note that assistance data delivery is not required for UE- or eNodeB-assisted forms of E-CID positioning and this is not currently supported without EPDU elements. UE-based E-CID location is not currently supported, and the assistance data delivery procedure is not applicable to uplink E-CID positioning. No assistance data is currently specified for E-CID for LPP. Some assistance data, however, may be provided for E-CID e.g. via LPPe.

In this regard, with Open Mobile Alliance (OMA) LPP extension (LPPe), assistance data is enhanced with the possibility to assist a larger range of positioning methods (e.g. assistance data may also be provided for E-CID or other methods of other RATs, e.g. OTDOA UTRA or E-OTD GSM, or other PLMN networks). Furthermore, there is also a possibility of carrying over a black-box data container meant for carrying vendor-/operator-specific assistance data.

Also note that LTE specifications enable Frequency Division Duplex (FDD) and Time Division Duplex (TDD) operation modes. Additionally, half duplex operation is also specified, which is essentially FDD operation mode but with transmission and receptions not occurring simultaneously as in TDD. Half duplex mode has advantages with some frequency arrangements where the duplex filter may be unreasonable, resulting in high cost and high power consumption. Since carrier frequency number (EARFCN) is unique, by knowing it, it is possible to determine the frequency band, which is either FDD or TDD. However, it may be more difficult to find the difference between full duplex FDD and half-duplex FDD (HD-FDD) without explicit information since the same FDD band can be used as full FDD or HD-FDD.

Further, inter-frequency measurements may in principle be considered for any positioning method, even though currently not all measurements are specified by the standard as intra- and inter-frequency measurements. When performing inter-frequency measurement, the serving and target carrier frequencies may belong to the same duplex mode or to different duplex modes e.g. LTE FDD-FDD inter-frequency, LTE TDD-TDD inter-frequency, LTE FDD-TDD inter-frequency or LTE TDD-FDD inter-frequency scenario. The FDD carrier may operate in full duplex or even in half duplex mode. Examples of inter-frequency measurements currently specified by the standard are Reference Signal Time Difference (RSTD) used for OTDOA, RSRP and RSRQ which may be used e.g. for fingerprinting or E-CID.

In LTE, measurement gaps are configured by the network to enable inter-frequency measurements on the other LTE frequencies. The measurements may be done for various purposes: mobility, positioning, self organizing network (SON), minimization of drive tests, etc. Regardless, the gap configuration is signaled to the UE over the Radio Resource Control (RRC) protocol as part of the measurement configuration. A UE that requires measurement gaps for positioning measurements, e.g., OTDOA, may send an indication to the network, e.g. eNodeB, upon which the network may configure the measurement gaps. Furthermore, the measurement gaps may need to be configured according to a certain rule, e.g. inter-frequency RSTD measurements for OTDOA require that the measurement gaps are configured according to the inter-frequency requirements in 36.133, Section 8.1.2.6, e.g. not overlapping with PRS occasions of the serving carrier and using gap pattern #0.

In LTE, inter-RAT measurements (e.g., measurements on other RATs like UTRA, GSM, CDMA2000, etc) are typically defined similar to inter-frequency measurements. Indeed, they may also require configuring measurement gaps like for inter-frequency measurements. Although inter-RAT measurements often have more relaxed requirements and have more measurements restrictions, the same gap pattern is used for all types of inter-frequency and inter-RAT measurements. Therefore E-UTRAN must provide a single measurement gap pattern with constant gap duration for concurrent monitoring (i.e. cell detection and measurements) of all frequency layers and RATs.

As a special example of inter-RAT measurements there may also be multiple networks, which use the overlapping sets of RATs. The examples of inter-RAT measurements specified currently for LTE are UTRA FDD CPICH RSCP, UTRA FDD carrier RSSI, UTRA FDD CPICH Ec/No, GSM carrier RSSI, and CDMA2000 1x RTT Pilot Strength.

For positioning, assuming that LTE FDD and LTE TDD are treated as different RATs, the current standard defines inter-RAT requirements only for FDD-TDD and TDD-FDD measurements, and the requirements are different in the two cases. There are no other inter-RAT measurements specified within any separate RAT for the purpose of positioning and which are possible to report to the positioning node (e.g. E-SMLC in LTE).

It is mandatory for all UEs to support all intra-RAT measurements (including both inter-frequency and intra-band measurements) and meet the associated requirements. However the inter-band and inter-RAT measurements are UE capabilities, which are reported to the network during the call setup. The UE supporting certain inter-RAT measurements should meet the corresponding requirements. For example a UE supporting LTE and WCDMA should support intra-LTE measurements, intra-WCDMA measurements and inter-RAT measurements (i.e. measuring WCDMA when serving cell is LTE and measuring LTE when serving cell is WCDMA). Hence network can use these capabilities according to its strategy. These capabilities are highly driven by factors such as market demand, cost, typical network deployment scenarios, frequency allocation, etc.

Notably, in single carrier LTE, a cell may operate at channel bandwidths ranging from 1.4 MHz to 20 MHz. However, a single-carrier legacy UE shall be able to receive and transmit over 20 MHz, i.e., the maximum single-carrier LTE bandwidth. If the serving-cell bandwidth is smaller than 20 MHz, then the UE shortens the bandwidth of its radio frequency (RF) front end. For example, if the serving-cell bandwidth (BW) is 5 MHz, then the UE will likewise configure its RF BW to 5 MHz. This approach has several advantages. For example, it enables the UE to avoid noise outside the current reception bandwidth, and it saves UE battery life by lowering power consumption.

However, such reconfiguration of the UE reception and/or transmission bandwidth involves some delay, e.g., 0.5-2 ms, depending on UE implementation and also on whether both UL BW and DL BW are reconfigured at the same time or not. This small delay is often referred to as 'glitch'. During the glitch the UE cannot receive from the serving cell or transmit to the serving cell. Hence this may lead to interruption in data reception or transmission from or to the serving cell. The UE is also unable to perform any type of measurements during the glitch. The glitch occurs either when the UE extends its bandwidth (e.g. from 5 MHz to 10 MHz) or when it shortens its bandwidth (e.g. from 10 MHz to 5 MHz).

Furthermore, when the UE operates at a bandwidth lower than its maximum reception capability and the UE then wants to measure over a larger bandwidth, it has to open its receiver for performing the measurement. Thus, in this case (i.e. when current BW<max BW) the glitch occurs before and after the UE obtains each measurement sample, if the UE reconfigures back to its current operation after each measurement sample over the larger bandwidth.

The glitch also occurs when a UE capable of carrier aggregation (CA) reconfigures its bandwidth from single carrier to multiple carrier mode or vice versa. For example consider a UE that is capable of CA and that supports 2 downlink (DL) component carriers (CCs), each of 20 MHz, including a primary CC (PCC) and a secondary CC (SCC). If the secondary component carrier is deactivated by the serving/primary cell then the UE will shorten its BW e.g. from 40 MHz to 20 MHz. This may cause 1-2 ms interruption on the PCC.

According to current standards, the maximum allowed measurement bandwidth on a carrier frequency is defined by the parameter Transmission Bandwidth Configuration "$N_{RB}$" in 3GPP TS 36.104, which may take values of 6, 15, 25, 50, 75 and 100 resource blocks. The DL bandwidth information of a cell is signaled in the Mater Information Block (MIB) which the UE reads before it can camp on the cell; the UL bandwidth information, if different from the DL bandwidth information, may further be signaled in SystemInformationBlockType2 (SIB2) [3GPP TS 36.331].

For cell reselection, i.e., when the UE has to measure on neighbor cells, the cell re-selection parameters that are common for intra-frequency, inter-frequency and/or inter-RAT cell re-selection are signaled in SystemInformationBlockType3 (SIB3). The element intraFreqCellReselectionInfo of SIB3 contains the allowedMeasBandwidth element, which corresponds to the DL bandwidth for measurements on intra-frequency cells. If that element is absent, the DL measurement bandwidth for intra-frequency cells is assumed to be the same as that indicated by the dl-Bandwidth included in MIB. The allowed measurement bandwidth is not signaled per cell, since it is assumed to be the same as for the serving cell, which is signaled in MIB and SIB2.

The information relevant for inter-frequency cell reselection only may be signaled via SIB5, which includes cell re-selection parameters common for a frequency as well as cell specific re-selection parameters. The allowed measurement bandwidth information is signaled per frequency in the InterFreqCarrierFreqInfo element.

Thus, cell-specific bandwidth information currently is not provided for cell re-selection. Rather, bandwidth information for cell re-selection is only provided per carrier.

Other cell-specific information for cell re-selection is currently provided for intra-frequency cells or inter-frequency cells. For intra-frequency cells, the information is provided in the IntraFreqNeighCellInfo element, when a list of cells is signaled in SIB4. For inter-frequency cells, the information is provided in the InterFreqNeighCellInfo element, when a list of cells is included in InterFreqCarrierFreqInfo signaled in SIB5.

Further, a neighCellConfig element is used to indicate whether or not some configurations for a neighbor cell are the same as for the serving cell. This element with the current standard can be signaled as either a part of intraFreqCellReselectionInfo (in SIB3) or a part of InterFreqCarrierFreqInfo (in SIB5).

Note that the neighCellConfig element is used to indicate potential configuration differences among cells of a particular frequency, without cell details. Currently, the neighCellConfig element is used to provide only the information related to MBSFN and TDD UL/DL configuration of neighbour cells of such frequency. In particular, values for the neighCellConfig element include 00, 10, 01, and 11. A value of '00' indicates that not all neighbour cells have the same MBSFN subframe allocation as the serving cell on the frequency, if configured, and as the PCell otherwise. A value of '10' indicates that the MBSFN subframe allocations of all neighbour cells are identical to or subsets of that in the serving cell on this frequency, if configured, and of that in the PCell otherwise. A value of '01' indicates that no MBSFN subframes are present in all neighbour cells. Finally, a value of '11' indicates that there is a different UL/DL allocation in neighbouring cells for TDD compared to the serving cell on this frequency, if configured, and compared to the PCell otherwise. Note that, for TDD, 00, 10 and 01 are only used for the same UL/DL allocation in neighbouring cells compared to the serving cell on this frequency, if configured, and compared to the PCell otherwise.

In view of the above described details, a UE may need to measure reference signals transmitted by multiple cells, e.g., for performing positioning measurements. This proves problematic in certain circumstances. One problematic circumstance occurs when the multiple cells have different cell bandwidths. Another problematic circumstance occurs when one or more of the cells do not use the full cell bandwidth, such as when those cells are provided by beacon devices. Still another problematic circumstance occurs when the reference signals to be measured are transmitted in the multiple cells with different bandwidths (irrespective of the cell bandwidths of those cells). And yet another problematic circumstance occurs when the UE obtains different measurement bandwidth information for cells to be measured and thereby measures those cells over different bandwidths.

In all of these circumstances, the UE has to reconfigure the receiver to enable measurements of cells with a larger bandwidth, which may be necessary to meet e.g. measurement accuracy requirements with respect to those cells. This proves problematic because configuring a receiver to a larger bandwidth, to meet measurement accuracy requirements for cells with that larger bandwidth, may degrade measurement quality in other cells with either a smaller associated measurement bandwidth or with a smaller cell bandwidth. Configuring the receiver to a larger bandwidth may also prove problematic if that bandwidth is larger than the serving-cell bandwidth. Indeed, particularly where the measurements being performed are intra-frequency measurements, measuring cells over such large bandwidth degrades the quality with which the UE receives data from the serving cell over a smaller bandwidth.

Still further, positioning measurements may be performed periodically. For instance, OTDOA positioning measurements are performed in positioning subframes that occur in blocks of consecutive DL subframes and with periodicity of 160 ms, 320, 640 ms, or 1280 ms. Receiver reconfiguration to a new measurement bandwidth in certain subframes takes time, and reconfiguring it back to the normal-operation measurement bandwidth in normal subframes also takes time. This reconfiguration time reduces the total effective measurement time, which typically results in degraded measurement accuracy and/or data reception quality.

SUMMARY

Embodiments herein advantageously address degradations to the quality of reference signal measurements and/or to the quality of serving cell data reception that would otherwise result from a wireless device measuring different cells' reference signals over different bandwidths. The embodiments address these potential degradations by intelligently configuring the bandwidth over which different cells actually transmit reference signals. Some embodiments also intelligently configure the bandwidth over which different wireless devices measure those reference signals, to prioritize either measurement quality or data reception performance on a device-by-device basis.

More particularly, embodiments herein include a method and apparatus for controlling the configuration of reference signals for transmission from cells in a wireless communication system. Processing according to the method, in particular, entails identifying the cell bandwidth of each cell in a set of cells that transmit reference signals likely to be measured during a given measurement session of a wireless device. Processing then includes selecting, as a function of the cell bandwidths, a reference-signal bandwidth over which reference signals are to be transmitted from at least a subset of the cells in the set. Finally, at least each cell in the subset is configured to transmit reference signals over this reference-signal bandwidth.

By configuring at least each cell in the subset to transmit reference signals over the reference-signal bandwidth, the method and apparatus ensure that at least some of the reference signals measured by a wireless device during a given measurement session will be transmitted over the same bandwidth. This generally mitigates degradations to the quality of reference signal measurements that would otherwise result if those reference signals had been transmitted over different bandwidths.

In at least some embodiments, cells are included in the set described above because they have a common pre-determined characteristic that indirectly indicates reference signals transmitted by those cells are likely to be measured during a given measurement session of a wireless device. This common pre-determined characteristic may be, for instance, that the cells belong to the same tracking area, are deployed in the same coverage area, transmit reference signals at one or more of the same times, and/or are served by the same class of base station.

Regardless, in at least some embodiments, the method and apparatus calculate the reference-signal bandwidth to be the cell bandwidth of a majority of the cells in the set. Although this may somewhat decrease the quality of reference signal measurements performed with respect to some minority of cells in the set, it may advantageously increase the quality of reference signal measurements performed with respect to the majority of cells. This is because reference signal measurements performed with respect to this majority may be performed over a longer period of time (e.g., if the measurements are inter-frequency measurements) and may be susceptible to less noise.

In other embodiments, the method and apparatus calculate the reference-signal bandwidth to be the minimum of the cell bandwidths of the cells in the set, and configure each cell in the set (rather than just the cells in some subset) to transmit reference signals over that reference-signal bandwidth. As compared to the above embodiments, the quality of some reference signal may be decreased because they are performed over a smaller bandwidth. But, the quality of other reference signal measurements may be increased because they are performed over an even longer period of time (since even more cells transmit reference signals with the same bandwidth) and may be susceptible to even less noise.

In at least some embodiments, the method and apparatus not only control the transmission of reference signals from the set as described above, but also implement device-specific processing to control the measurement of those signals by individual wireless devices. In particular, these embodiments configure a measurement bandwidth over which a particular wireless device is to measure a reference signal transmitted from a cell in the set.

Notably, one or more such embodiments advantageously take into account a device's serving-cell bandwidth when configuring such measurement bandwidth (e.g., for an intra-frequency measurement), in order to prioritize, or at least mitigate degradations to, the quality with which the device receives data from its serving cell. For example, one embodiment that absolutely prioritizes data reception quality configures the measurement bandwidth over which a device is to measure the reference signal transmitted from a cell in the set to be the serving-cell bandwidth for that device. The embodiment does so even if that cell actually transmits a reference signal over a bandwidth larger than the serving-cell bandwidth. In this regard, the embodiment may degrade the quality of the reference signal measurement in order to ensure the quality of data reception.

Other embodiments are described more fully herein that account for a device's serving-cell bandwidth by adopting a more balanced stance between reference signal measurement quality and data reception quality. One such embodiment, for instance, conditionally re-configures a device's measurement bandwidth to be different than its serving-cell bandwidth if doing so will not significantly degrade data reception quality.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 2 illustrates the structure of the provideAssistanceData element in the LPP protocol.

DETAILED DESCRIPTION

Figure 1:
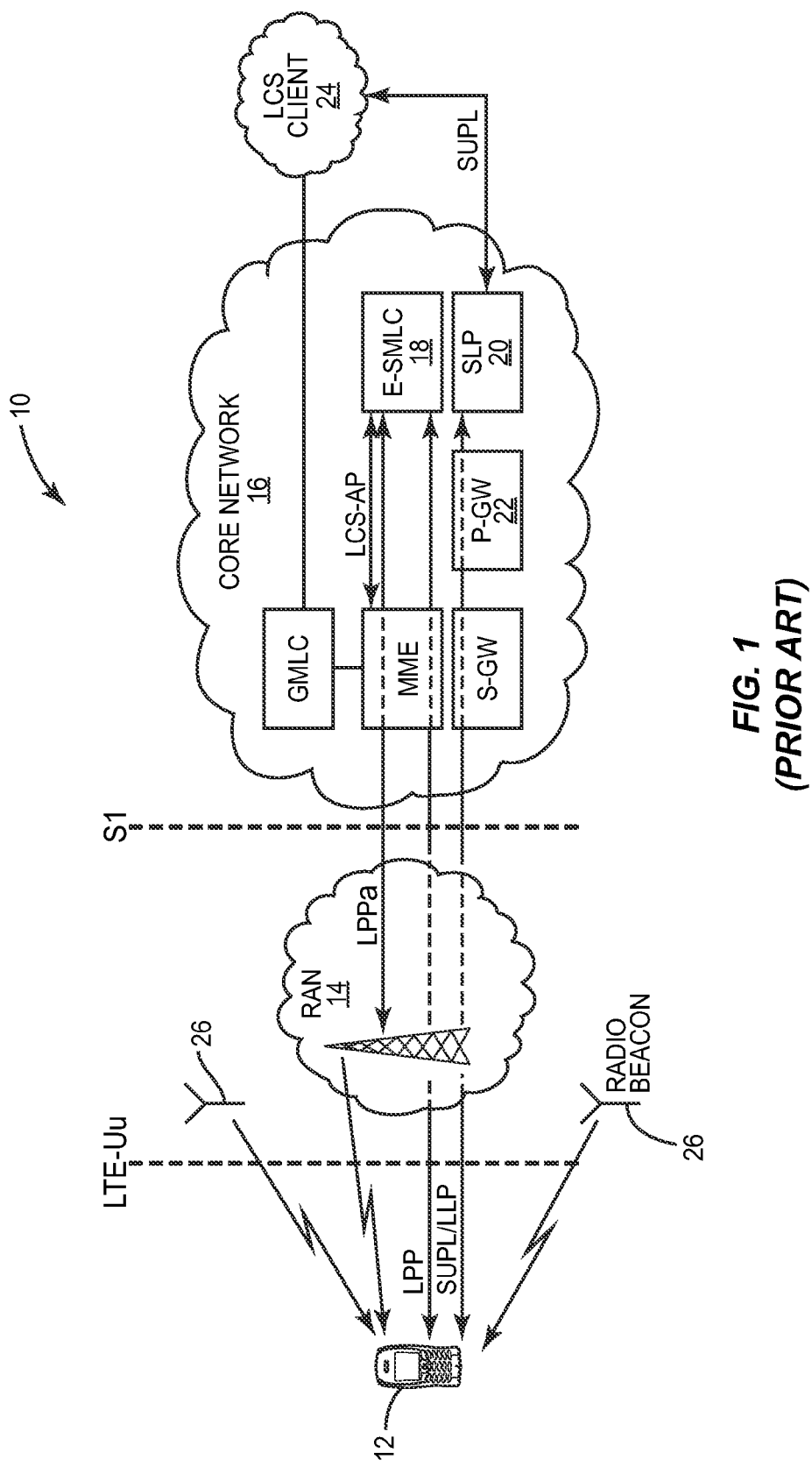
FIG. 1 illustrates components of the LTE positioning architecture.
Figure 3:
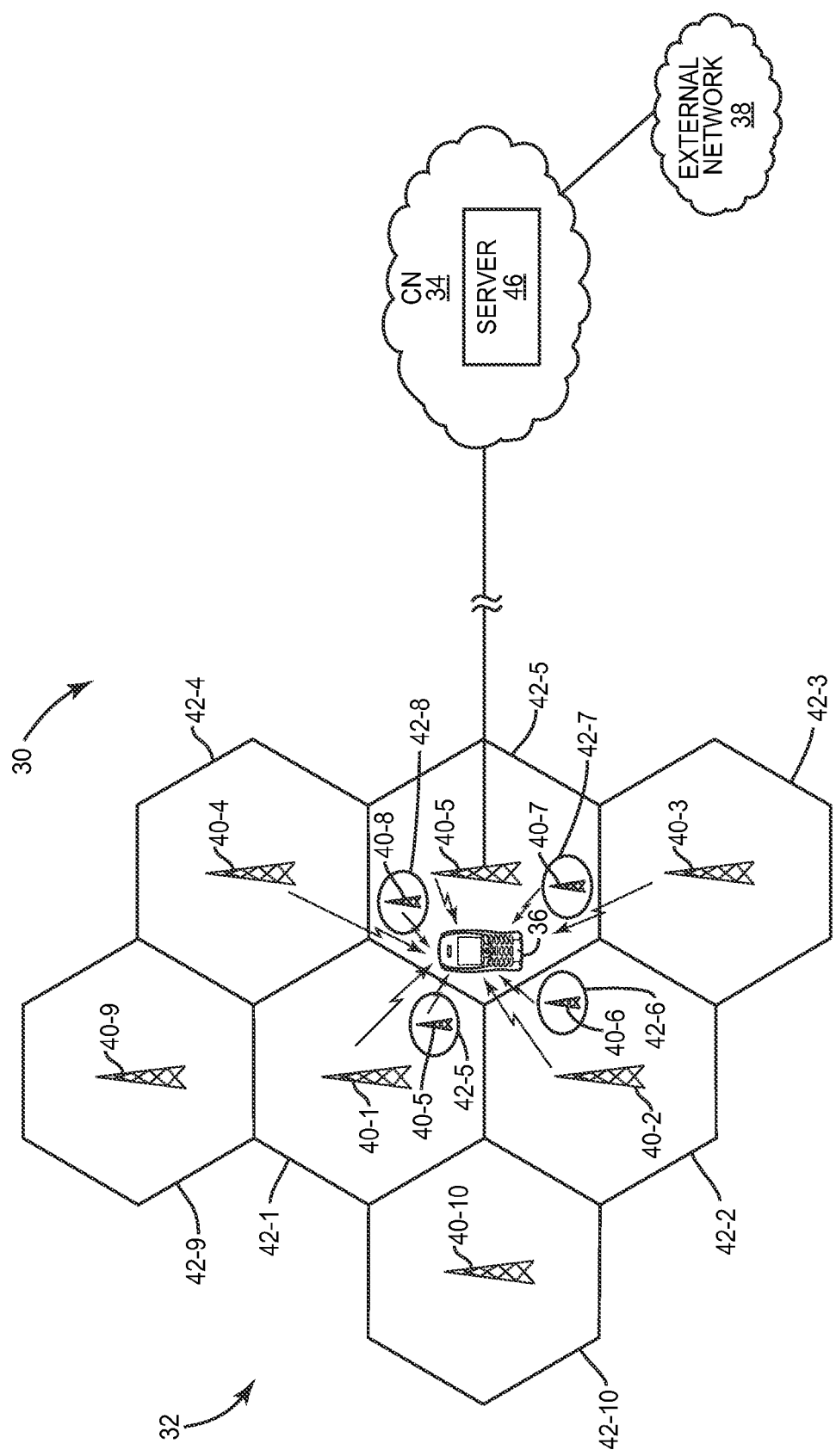
FIG. 3 is a block diagram of a wireless communication system that includes a network node and a wireless device configured according to one or more embodiments herein.

FIG. 3 depicts a simplified example of wireless communication system 30 according to one or more embodiments. As shown, the system 30 includes a Radio Access Network (RAN) 32, a Core Network (CN) 34, and one or more wireless devices 36. The RAN 32 and CN 36 enable a wireless device 36 to access one or more external networks 38, such as the Public Switched Telephone Network (PSTN) or the Internet.

The RAN 32 includes a number of base stations 40 that are geographically distributed across the wide geographic area served by the system 30. Each base station 40 provides radio coverage for one or more respective portions of that geographic area, referred to as cells 42. Because of this, a wireless device 36 may move within or between cells 42 and may communicate with one or more base stations 40 at any given position.

Different cells 42 may have different nominal sizes, depending on the maximum transmit power utilized by the base stations 40 serving those cells 42. As shown, for example, base station 40-1 has a relatively large maximum transmit power and correspondingly serves wireless devices 36 within a relatively large cell 42-1, while base station 40-5 has a relatively small maximum transmit power and correspondingly serves wireless devices 36 within a relatively small cell 40-5. In general, different base stations 40 that have different pre-defined maximum transmit powers (and thereby serve cells 42 of different nominal sizes) belong to different base station classes (e.g., a macro base station class, a micro base station class, a pico base station class, etc.).

Furthermore, different cells 42 may generally be configured to operate over different predefined bandwidths, referred to herein as cell bandwidths. A given cell 42 may transmit a signal over a bandwidth smaller than its cell bandwidth, but may not transmit a signal over a bandwidth larger than its cell bandwidth.

Within this context, FIG. 3 depicts a particular wireless device 36 that, at its current position, is served by base station 40-*s* in the sense that the device 36 receives data from that base station 40-*s*. The base station 40-*s* transmits this data to the device 36 on a particular frequency (referred to as the serving cell frequency) and over a particular bandwidth (known as the serving-cell bandwidth). Thus, from the perspective of this wireless device 36, base station 40-*s* is the serving base station and cell 42-*s* is the serving cell. Other cells 42 that are geographically adjacent to or partially coincident with the serving cell 42-*s* are appropriately referred to as neighboring cells. In this simplified example, all cells 42 shown are neighboring cells except for cells 40-9 and 40-10.

Each of the cells 42 (via its base station 40) periodically transmits a so-called reference signal 44. A reference signal 44 as used herein is a predetermined signal that is known to both a cell 42 transmitting that signal and a wireless device 36 receiving the signal. A reference signal 44 may be transmitted by a cell 42 on the same or a different frequency as the serving cell frequency. Reference signals 44 transmitted by the cells 42 in this way can be measured by a wireless device 36. The device 36 may measure reference signals 44 transmitted by neighboring cells 42 on the serving cell frequency at the same time as which the device 36 receives data from the serving cell 42-*s* on that frequency. Such measurements are appropriately referred to as intra-frequency measurements. Conversely, in at least some embodiments, the device 36 must measure reference signals 44 transmitted by neighboring cells 42 on a non-serving cell frequency at a different time than the time at which the device 36 receives data from the serving cell 42-*s* on the serving frequency. These measurements are referred to as inter-frequency measurements. Regardless, the reference signal measurements can then used for various purposes, including for example mobility management or determining the geographic position of the device 36.

In this regard, a wireless device 36 may establish a session with a server 46 in the core network 35 for accomplishing such a purpose. This session may include one or more transactions between the device 36 and the server 46. Each transaction pertains to a particular operation, such as the exchange of capabilities, the transfer of assistance data from the server 46 to the device 36 for assisting the device 36 to perform reference signal measurements, or the transfer of information concerning the ultimate purpose of those measurements (e.g., the actual position of the device 36). Since the device 36 performs reference signal measurements in the context of such a session, the session will be referred to herein as a measurement session of the device 36.

Within any given measurement session of a device 36, the device 36 may measure reference signals 44 transmitted from different cells 42. If all of these cells 42 transmit reference signals 44 over the serving frequency, the cells 42 may be measured at the same time during the measurement session. But, if different cells 42 transmit reference signals over different non-serving frequencies, those cells 42 may need to be measured at different times during the measurement session.

Regardless, according to at least some known approaches, each cell 42 would transmit a respective reference signal 44 over its entire cell bandwidth. If at least one of the cell bandwidths was larger than the serving cell's cell bandwidth, the device 36 would have had to reconfigure its receiver to that larger bandwidth in order to measure the reference signal 44 transmitted from that cell 42. This would problematically degrade the quality of reference signal measurements made at the same time with respect to cells 42 that had a smaller cell bandwidth, and degrade the quality with which data was received at that time from the serving cell 42-*s*.

Figure 4:
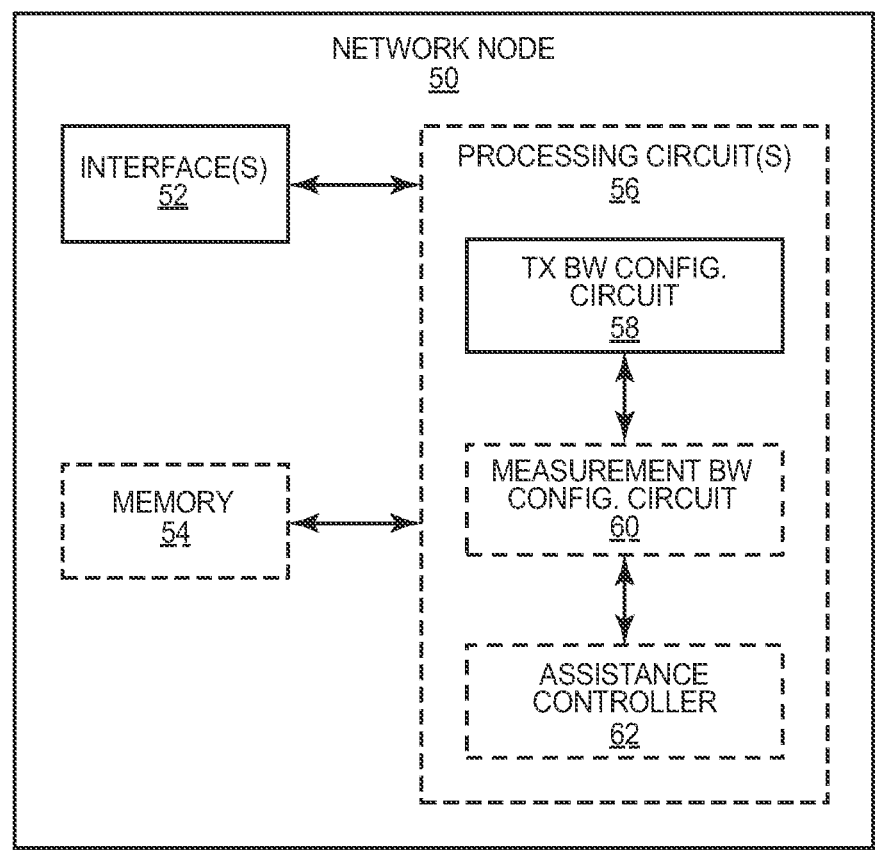
FIG. 4 is a block diagram of a network node configured according to one or more embodiments.

One or more embodiments herein advantageously address these degradations that would occur in known approaches, by intelligently configuring the bandwidth over which different cells 42 actually transmit reference signals 44. This intelligent reference-signal bandwidth configuration may be performed by a radio node in the RAN 32 (such as one of the base stations 40) or by a node in the CN 34 (such as server 46). FIG. 4 correspondingly illustrates additional details of such a node, referred to generally as a network node 50.

As shown in FIG. 4, the network node 50 includes one or more communication interfaces 52, a memory 54, and one or more processing circuits 56. The one or more communication interfaces 52 may include a network interface for communicatively coupling the node 50 to other nodes in the RAN 32 or CN 34. If the network node 50 is located in the RAN 32, the one or more communication interfaces 52 may further include a radio interface for communicatively coupling the node 50 to wireless devices 36.

The one or more processing circuits 56 are configured to control the configuration of reference signals 44 for transmission from cells 42 in the system 30. Specifically, the one or more processing circuits 56 may functionally include a transmission (TX) bandwidth (BW) configuration circuit 58 configured to intelligently configure the bandwidth over which different cells 42 transmit reference signals 44.

In this regard, and as explained more fully below, the TX BW configuration circuit 58 is configured to identify the cell bandwidth of each cell 42 in a set of cells 42 that transmit reference signals 44 likely to be measured during a given measurement session of a wireless device 36. The TX BW configuration circuit 58 is then configured to select, as a function of the identified cell bandwidths, a reference-signal bandwidth over which reference signals 44 are to be transmitted from at least a subset of the cells 42 in the set. Finally, the TX BW configuration circuit 58 configures at least each cell 42 in the subset to transmit reference signals 44 over the reference-signal bandwidth.

By configuring at least each cell 42 in the subset to transmit reference signals 44 over the reference-signal bandwidth, the TX BW configuration circuit 58 effectively ensures that at least some of the reference signals 44 measured by a wireless device 36 during a given measurement session will be transmitted over the same bandwidth. This generally mitigates degradations to the quality of reference signal measurements that would otherwise result if those reference signals 44 had been transmitted over different bandwidths.

Note that the set of cells 42 on which the TX BW configuration circuit 58 bases its reference-signal bandwidth configuration is not specific to any particular wireless device 36. That is, the set includes those cells 42 that transmit reference signals likely to be measured during the same measurement session of any given wireless device 36, as opposed to those cells 42 that transmit reference signals in fact measured during the same measurement session of a particular device 36. As a result, the reference-signal bandwidth configuration herein commonly affects all wireless devices 36 within the set of cells 42, rather than just particular wireless devices 36.

In this regard, the TX BW configuration circuit 58 may be pre-configured with the identity of the cells 42 included in the set, or may autonomously select the cells 42 to include in the set based on pre-configured selection rules. In either case, the cells 42 are included in the set because they have a common pre-determined characteristic that indirectly indicates reference signals 44 transmitted by those cells 42 are likely to be measured during a given measurement session of a wireless device 36.

In some embodiments, this common pre-determined characteristic is that the cells 42 in the set belong to or are otherwise associated with the same so-called tracking area. A tracking area as used herein refers to a group of cells 42, and the size of that group of cells 42 defines the granularity with which the system 10 tracks wireless devices 36 in an idle state. In other words, a wireless device 36 in an idle state updates the system 30 of its position (e.g., for paging purposes) when it moves from one tracking area to another, rather than when the device 36 moves from one cell 42 to another. Because cells 42 belonging to the same tracking area are by definition grouped together, embodiments herein advantageously recognize that reference signals 44 transmitted from those cells 42 are likely to be measured during the same measurement session of any given wireless device 36.

Other embodiments advantageously recognize that this is also the case for other common pre-determined characteristics. For example, in at least one other embodiment, the common pre-determined characteristic is that the cells 42 in the set are deployed in the same coverage area. In this regard, cells 42 are deployed in the same coverage area if they are deployed in the same radio propagation environment (e.g., indoors or outdoors), in the same physical proximity so to collectively provide radio coverage for the same area (e.g., a particular district), or the like.

In still other embodiments, the common pre-determined characteristic is that the cells 42 in the set transmit reference signals at one or more of the same times (i.e., simultaneously). Whether cells 42 transmit reference signals at the same time may depend on any so-called muting configurations of those cells. In this regard, a cell 42 may generally transmit reference signals with a defined periodicity, and within defined radio resources, but may mute or otherwise refrain from transmitting reference signals at certain times and/or within certain radio resources, according to a defined muting pattern. Embodiments herein advantageously account for such muting configurations in a determination of whether cells 42 are to be included in the set.

Finally, in yet other embodiments, the common pre-determined characteristic is that the cells 42 in the set are served by or otherwise correspond to the same class of base station 40. As used herein, a class of a base station 40 generally pertains to the size of the coverage area of that base station. Various classes of base stations 40 may be pre-defined in the system 30, such as a macro base station class, a micro base station class, a pico base station class, and so on.

Irrespective of the particular characteristic that is common to all cells 42 in the set, the TX BW configuration circuit 58 uses those cells' cell bandwidths to select the reference-signal bandwidth over which reference signals are to be transmitted from at least a subset of the cells 42 in the set. In one embodiment, for example, the TX BW configuration circuit 58 calculates the reference-signal bandwidth to be the cell bandwidth of a majority of the cells 42 in the set. In this case, the subset of cells 42 configured to transmit reference signals over this bandwidth includes those cells 42 in the set that have a cell bandwidth greater than or equal to the reference-signal bandwidth. In other words, those cells 42 in the set that have a cell bandwidth greater than or equal to the cell bandwidth of the majority of cells 42 in the set are included in the subset and configured to transmit reference signals over that majority bandwidth. Conversely, those cells 42 in the set that are not included in the subset (because they have a cell bandwidth smaller than the cell bandwidth of the majority of cells 42 in the set) are simply configured to transmit reference signals over their respective cell bandwidths. As a simple example, assume that the set of cells 42 includes a wireless device's serving cell 42-s, as well as macro cells 42-1 through 42-4. If cells 42-s, 42-1, and 42-2 have a cell bandwidth of 10 MHz, cell 42-3 has a cell bandwidth of 15 MHz, and cell 42-4 has a cell bandwidth of 5 MHz, then the TX BW configuration circuit 58 will calculate the reference-signal bandwidth to be 10 MHz as the cell bandwidth of the majority of the cells 42 in the set. The TX BW configuration circuit 58 will further determine that the subset of cells 42 that are to be configured to transmit reference signals over this 10 MHz reference-signal bandwidth includes cells 42-s, 42-1, 42-2, and 42-3, as the cells that have a cell bandwidth greater than or equal to the 10 MHz reference-signal bandwidth. Finally, the TX BW configuration circuit 58 configures cell 42-4 to transmit reference signals over its own 5 MHz cell bandwidth.

In view of this simple example, one can appreciate that the majority of cells 42 in the set (e.g., cells 42-s, 42-1, 42-2, and 42-4) are configured to transmit reference signals over their respective cell bandwidths, while some minority of cells 42 in the set (e.g., cells 42-3) may be configured to transmit reference signals over bandwidths that are smaller than their respective cell bandwidths. Although the quality of reference signal measurements performed with respect to this minority of cells 42 may be somewhat decreased because they are performed over a smaller bandwidth, the quality of reference signal measurements performed with respect to the majority of cells 42 may be significantly increased. This is because reference signal measurements performed with respect to this majority may be performed over a longer period of time (particularly for inter-frequency measurements, since the device 36 will not have to spend any or as much time re-configuring its receiver to account for different bandwidths over which reference signal measurements are to be performed) and/or may be susceptible to less noise (since the device 36 will not be measuring the reference signals over a greater bandwidth than which they are transmitted).

In the above embodiments, the TX BW configuration circuit 58 determines the reference-signal bandwidth by dynamically calculating the cell bandwidth of the majority of cells 42 in the set. This proves advantageous particularly in cases where the cells 42 in the set dynamically vary, e.g., due to the addition of new cells 42 to the system 30. In other embodiments, though, such as where the cells 42 in the set remain largely static, the TX BW configuration circuit 58 may be pre-configured with a default reference-signal bandwidth. This default reference-signal bandwidth may reflect the cell bandwidth of the majority of cells 42 that were included in the set at a particular point in time and, assuming the set remains mostly the same, the TX BW configuration circuit 58 will achieve similar advantages as above. Indeed, the TX BW configuration circuit 58 in these embodiments need only identify the subset of cells 42 as being those cells 42 in the set that have a cell bandwidth greater than or equal to the default bandwidth, and then configure those cells 42 with the default bandwidth.

Of course, even if the default reference-signal bandwidth does not actually reflect the cell bandwidth of the majority of cells 42 in the set, configuring the cells 42 in the subset with that default bandwidth may still prove advantageous. This is because the number of cells 44 transmitting reference signals 44 over the same bandwidth may increase, and thereby decrease the device's receiver re-configuration time for inter-frequency measurements.

Note, of course, that in the above embodiments at least some cells 42 in the set (e.g., cell 42-4) may transmit reference signals over bandwidths that are smaller than the reference-signal bandwidth. Measurements performed with respect to these signals may still be susceptible to non-trivial levels of noise, at least in some scenarios where the device 36 measures those signals over the reference-signal bandwidth.

Other embodiments herein address this issue by effectively prioritizing noise minimization (while even further minimizing receiver re-configuration time). In these embodiments, the TX BW configuration circuit 58 calculates the reference-signal bandwidth to be the minimum of the cell bandwidths of the cells 42 in the set, and configures each cell 42 in the set (rather than just the cells 42 in some subset) to transmit reference signals 44 over that reference-signal bandwidth. Thus, in the context of the previously presented example with macro cells 42-s and 42-1 through 42-4, the TX BW configuration circuit 58 would calculate the reference-signal bandwidth to be 5 MHz and configure each of those cells 42-s and 42-1 through 42-4 to transmit reference signals 44 over that 5 MHz reference-signal bandwidth. As compared to the above embodiments, the quality of some reference signal measurements (e.g., those performed with respect to all cells other than 42-4) may be decreased because they are performed over a smaller bandwidth. But, the quality of other reference signal measurements may be increased because they are performed over an even longer period of time (particularly for inter-frequency measurements, since even more cells 42 transmit reference signals 44 with the same bandwidth) and may be susceptible to even less noise (since the device 36 will not be measuring any reference signals over a greater bandwidth than which they are transmitted).

Figure 5:
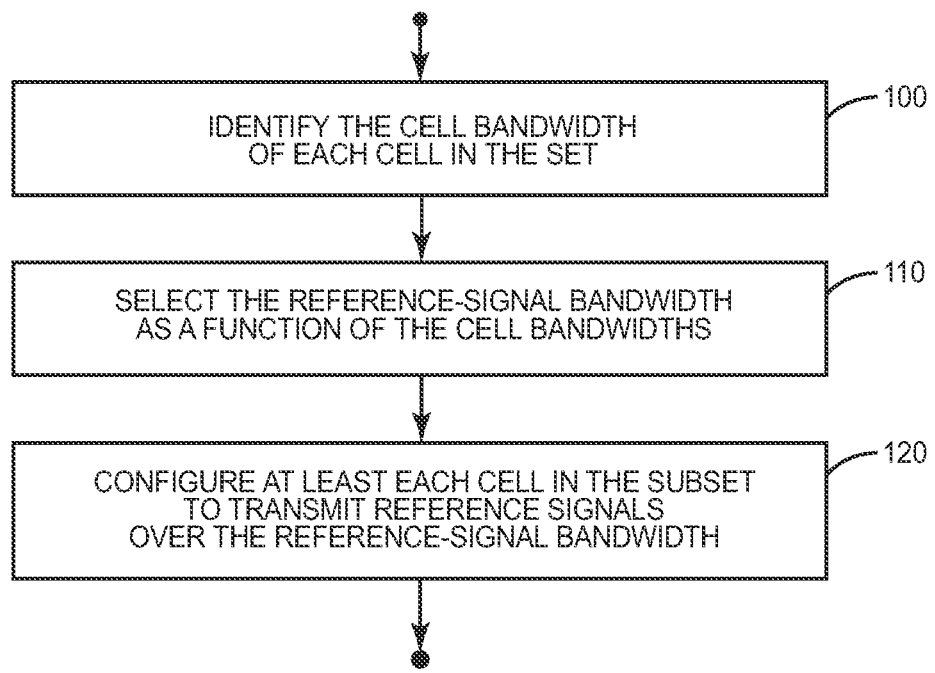
FIG. 5 is a logic flow diagram of a method implemented by a network node for controlling the transmission of reference signals from cells in a wireless communication system and the measurement of those signals by wireless devices, according to one or more embodiments.

In view of the above variations and modifications, those skilled in the art will appreciate that the one or more processing circuits 50 of the network node 50 (in particular, the TX BW configuration circuit 58) generally performs the processing shown in FIG. 5 for controlling the configuration of reference signals 44 for transmission from cells 42 in the system 30. As shown in FIG. 5, such processing includes identifying the cell bandwidth of each cell 42 in a set of cells 42 that transmit reference signals 44 likely to be measured during a given measurement session of a wireless device 36 (Block 100). Processing then includes selecting, as a function of those cell bandwidths, a reference-signal bandwidth over which reference signals are to be transmitted from at least a subset of the cells 42 in the set (Block 110). Finally, processing entails configuring at least each cell 42 in the subset to transmit reference signals 44 over that reference-signal bandwidth (Block 120). As suggested above, this processing may be performed once during setup of the system 30 (or during setup of the set of cells 42), or may be performed dynamically responsive to the introduction of a new cell to the system 30.

In at least some embodiments, the one or more processing circuits 56 not only control the configuration of reference signals 44 for transmission from the set as described above, but also control the measurement of those signals by wireless devices 36. In particular, the one or more processing circuits 56 in FIG. 4 may further functionally include a measurement bandwidth configuration circuit 60. This measurement BW configuration circuit 60 performs device-specific processing to configure one or more bandwidths over which a particular wireless device 36 is to measure the reference signals 44 transmitted from one or more respective cells 42 in the set. Such a bandwidth is appropriately referred to as a measurement bandwidth.

In at least some embodiments, an assistance controller 62 is implemented by the one or more processing circuits 56 and informs the wireless device 36 about the one or more measurement bandwidths. Specifically, the assistance controller 62 in this case transmits assistance data to the wireless device 36, via the one or more interfaces 52, in order to assist the device 36 in the performance of reference signal measurements. This assistance data includes a parameter that indicates the one or more measurement bandwidths.

In one or more embodiments, the measurement BW configuration circuit 60 configures the measurement bandwidth over which a device 36 is to measure the reference signal 44 transmitted from a particular cell 42 in the set to be the reference-signal bandwidth (which, as described above, is the bandwidth over which the TX BW configuration circuit 58 configures each cell 42 in the subset to transmit its reference signal 44). In fact, in some embodiments, the measurement bandwidth is configured to be the reference-signal bandwidth for all cells 42 in the subset, in the interest of configuring the measurement bandwidth to be the same for those cells 42.

Although this proves advantageous in many cases, in other cases it may be problematic. Consider for instance a case where one cell 42 in the set transmits its reference signal 44 over a bandwidth smaller than the reference-signal bandwidth (i.e., because the cell's cell bandwidth is smaller than the reference-signal bandwidth). The device 36 must still measure this reference signal 44 over the smaller bandwidth, even if the device 36 is to simultaneously measure other reference signals 44 over the reference-signal bandwidth. This will introduce noise to the reference signal measurement performed over the smaller bandwidth. More problematically, if that cell 42 is the device's serving cell 42-s (meaning that the serving-cell bandwidth is smaller than the reference-signal bandwidth), data received by the device 36 from the cell 42-s may be susceptible to noise.

In this regard, one or more other embodiments advantageously take into account a device's serving-cell bandwidth when configuring measurement bandwidth, in order to prioritize, or at least mitigate degradations to, the quality with which the device 36 receives data from its serving cell 42-s. For example, in one embodiment that absolutely prioritizes data reception quality, the measurement BW configuration circuit 60 configures the measurement bandwidth over which a device 36 is to measure the reference signal 44 transmitted from a cell 42 in the set to be the serving-cell bandwidth for that device 36. The measurement BW configuration circuit 60 may do so even if the TX BW configuration circuit 58 has configured that cell 42 to transmit a reference signal 44 over a bandwidth larger than the serving-cell bandwidth. In this regard, the measurement BW configuration circuit 60 may degrade the quality of some reference signal measurements (particularly intra-frequency measurements), but ensures the quality of data reception.

Still other embodiments herein that account for a device's serving-cell bandwidth adopt a more balanced stance between reference signal measurement quality and data reception quality. These embodiments particularly strike a compromise between configuring measurement bandwidth to be different than the serving-cell bandwidth (which may improve reference signal measurement quality) and configuring measurement bandwidth to be the same as the serving-cell bandwidth (which may improve data reception quality).

In such embodiments, the measurement BW configuration circuit 60 generally configures the measurement bandwidth over which a device 36 is to measure the reference signal 44 transmitted from a cell 42 in the subset to be the serving-cell bandwidth for that device 36. However, the measurement BW configuration circuit 60 selectively re-configures that measurement bandwidth from being equal to the serving-cell bandwidth to being equal to the reference-signal bandwidth, depending on whether or not a defined condition is met. This defined condition is associated with at least one of data reception quality with respect to the serving cell 42-s and reference signal measurement quality.

In at least one embodiment, for example, the condition defines a particular circumstance under which the measurement bandwidth may be re-configured to the reference-signal bandwidth without significantly degrading the data reception quality. This condition may be, for instance, that the device 36 will measure the reference signal 46 with a periodicity that is longer than a defined threshold (e.g., 640 ms). Indeed, when this condition is met, the device 36 will have enough time in between reference signal measurements to re-configure the bandwidth of its receiver back to the serving-cell bandwidth, meaning that data reception quality will not be significantly degraded due to a reduced amount of time to receive that data (i.e., glitches).

In another embodiment, the condition defines a particular circumstance under which the measurement bandwidth must be re-configured to the reference-signal bandwidth in order to meet defined accuracy requirements for reference signal measurements (e.g., where the measurements are performed for positioning, RSTD accuracy requirements specified in 3GPP TS 36.133). Such condition may be that the device 36 will measure the reference signal 44 over a number of consecutive subframes that does not exceed a defined threshold, where this threshold is the minimum number of consecutive threshold needed to meet the accuracy requirements. Thus when this condition is met, the device 36 is already configured to measure the reference signal 44 for the minimum amount of time needed to meet the accuracy requirements and therefore will not be able to meet the requirements unless it measures the reference signal 44 over the full bandwidth with which that signal 44 is transmitted. Accordingly, when the condition is met, the measurement bandwidth is re-configured to the reference-signal bandwidth. When the condition is not met, the measurement bandwidth is not re-configured and remains equal to the serving-cell bandwidth. This is especially the case if the device 36 will measure reference signals 44 transmitted from the serving cell 42-*s* over the defined threshold number of consecutive subframes. For example, the measurement bandwidth reconfiguration may be performed when the number of consecutive subframes to be measured does not exceed a threshold.

Yet other embodiments address any tension between reference signal measurement quality and data reception quality by controlling whether or not a particular device 36 will even measure reference signals 44 from certain cells 42 in the set (as opposed to the above embodiments that instead control the bandwidth over which such measurements would be performed). In these embodiments, the one or more processing circuits 56 determine, for each cell 42 in the set, whether or not the device 36 is to measure a reference signal 44 transmitted from that cell, based on whether or not the cell 42 is configured to transmit the reference signal 44 over a bandwidth smaller than the device's serving-cell bandwidth. When the one or more processing circuits 56 determine that the device 36 is to measure at least one of those reference signals 44, the circuits 56 generate and send to the device 36 a request to perform those measurements. Thus, the device 36 is only requested to perform measurements with respect to those cells 42 in the set that transmit reference signals 44 over a bandwidth smaller than the serving-cell bandwidth. Because of this, the device 36 will not re-configure the bandwidth of its receiver to a bandwidth greater than the serving-cell bandwidth and will therefore preserve its data reception quality with respect to the serving cell 42-*s*.

In one specific example of these embodiments, the one or more processing circuits 56 transmit assistance data to a device 36 indicating on which cells 42 in the set the device 36 is to perform measurements. Where such measurements are inter-frequency measurements, cells on a frequency other than the serving cell frequency are included in the assistance data when they are configured to transmit reference signals 44 over a bandwidth that is not smaller than that of the serving-cell bandwidth. Thus, in this example, all cells in the assistance data may be on a frequency carrier different than the serving frequency carrier.

Those skilled in the art will readily appreciate that the examples herein have been simplified in a number of respects for purposes of illustration. Indeed, at least some aspects of the processing illustrated above may be performed as part of a larger set of supporting or complementary functions. In one embodiment, for instance, the network node 50 not only configures at least some cells 42 in the set to transmit reference signals 44 over the same bandwidth, but also configures those cells 42 to transmit reference signals 44 according to the same measurement pattern. A measurement pattern as used herein refers to a pattern of low-interference subframes in which the reference signals 44 are transmitted, and may be for instance a PRS configuration, PRS muting, or eICIC measurement pattern in LTE embodiments. Regardless, the bandwidth over which reference signals 44 are transmitted serves in these embodiments as a criterion for grouping cells 42 for which the same measurement pattern is configured. Such enables parallel reference signal measurements for cells 42 that have similar bandwidths, while at the same time permitting variation in the cell bandwidth, transmission bandwidth, and/or measurement bandwidth among different cells 42.

Those skilled in the art will further appreciate that the various embodiments above generally teach that data reception quality with respect to a device's serving cell will improve if reference signal measurements (in particular intra-frequency measurements) are performed over a bandwidth that does not exceed the serving-cell bandwidth. Accordingly, one skilled in the art will appreciate that other embodiments herein include a wireless device 36 that is configured to ensure that reference signal measurements are performed over the serving-cell bandwidth, despite the device 36 being requested or instructed to perform those measurements over a larger bandwidth.

Figure 6:
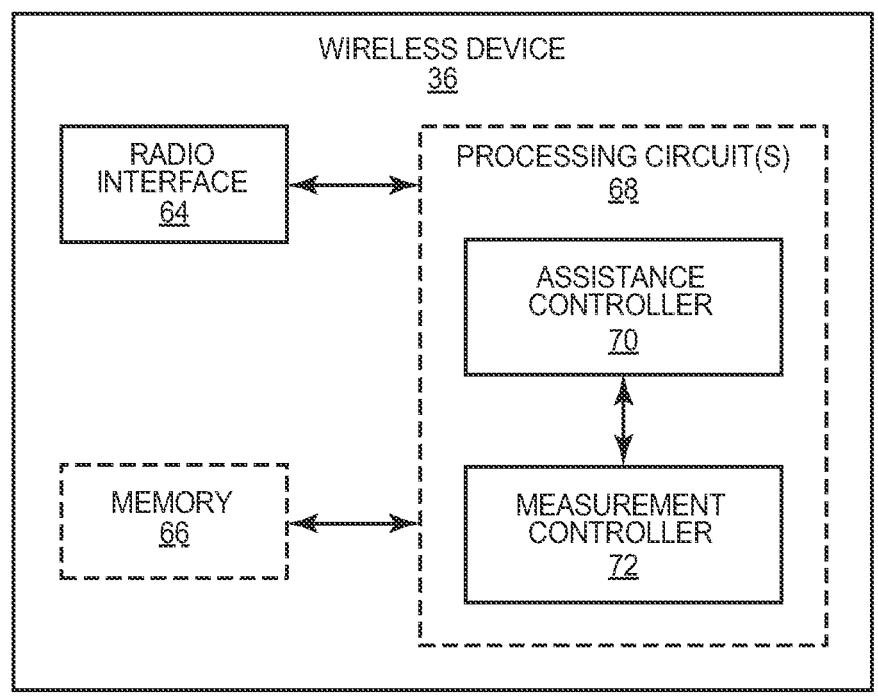
FIG. 6 is a block diagram of a wireless device configured to measure reference signals according to one or more embodiments.

In this regard, FIG. 6 illustrates a wireless device 36 that is configured to measure reference signals 44 transmitted by a cell 42 that neighbors the device's serving cell 42-*s*. As shown, the device 36 includes a radio interface 64, a memory 66, and one or more processing circuits 68. The radio interface 64 is configured to communicatively couple the device 36 to a radio node in the RAN 32. The one or more processing circuits 68 are configured to ensure that the device 36 performs reference signal measurements over a bandwidth that does not exceed the serving-cell bandwidth. Particularly in this regard, the one or more processing circuits may functionally include an assistance controller 70 and a measurement controller 72.

The assistance controller 70 is configured to obtain assistance data that indicates a reference-signal bandwidth over which the device 36 is to measure reference signals 44. If the reference-signal bandwidth indicated in the assistance data is larger than the device's serving-cell bandwidth, the measurement controller 72 is configured to actually measure the reference signals 44 over the serving-cell bandwidth, rather than the reference-signal bandwidth indicated in the assistance data. Conversely, if the reference-signal bandwidth indicated in the assistance data is smaller than the device's serving-cell bandwidth, the measurement controller 72 is configured to actually measure the reference signals 44 over the reference-signal bandwidth indicated in the assistance data.

According to one or more embodiments herein, the measurement controller 72 also conditions measuring the reference signals 44 over the serving-cell bandwidth, rather than the reference-signal bandwidth indicated in the assistance data, on other criteria. For example, in at least one embodiment, the measurement controller 72 only measures the reference signals 44 over the serving-cell bandwidth if a predefined signal level condition is met. In yet another embodiment, the measurement controller 72 only measures the reference signals 44 over the serving-cell bandwidth if a predefined condition on a measurement configuration is met. This measurement configuration may be, for instance, a periodicity of the reference signals 44, or a number of consecutive subframes containing the reference signals 44 in a measurement occasion (e.g., a positioning occasion).

Figure 7:
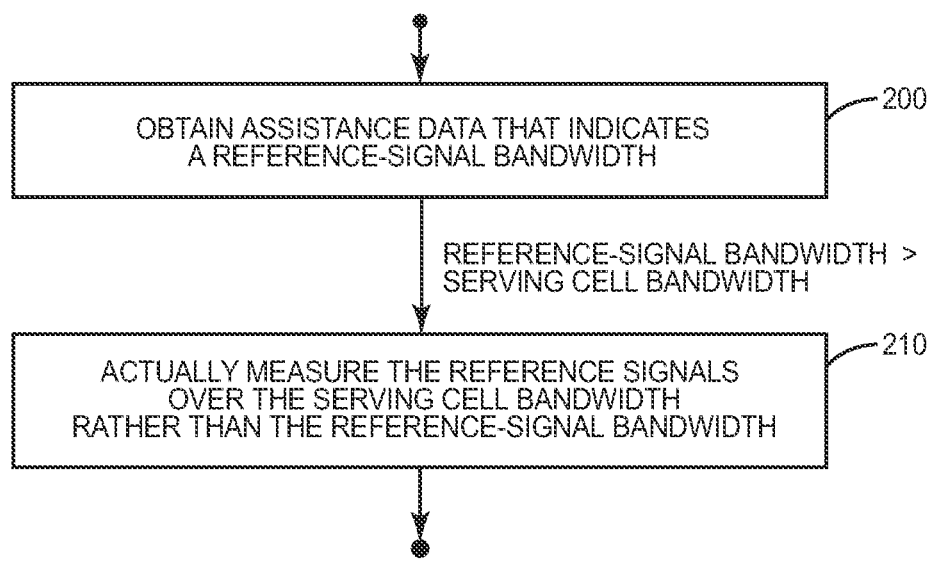
FIG. 7 is a logic flow diagram of a method implemented by a wireless device for measuring reference signals according to one or more embodiments.

Thus, those skilled in the art will readily appreciate that a wireless device 36 herein may generally perform the processing in FIG. 7 for measuring reference signals 44 transmitted by a neighbor cell 42. As illustrated in FIG. 7, such processing includes obtaining assistance data that indicates a reference-signal bandwidth over which the wireless device 36 is to measure those reference signals 44 (Block 200). If the reference-signal bandwidth indicated in the assistance data is larger than a serving-cell bandwidth, processing entails actually measuring the reference signals 44 over the serving-cell bandwidth rather than the reference-signal bandwidth indicated in the assistance data (Block 210).

Those skilled in the art will further understand that the reference signal measurements at issue in the above embodiments may be utilized for any number of different purposes, including for example mobility management or determining the geographic position of the device 36. In this latter case, a reference signal 46 herein will be specifically designed (e.g., with good signal quality) to be a signal on which a wireless device 36 performs positioning measurements. These positioning measurements are to be used by the device 36 itself, or some server 46 in the core network 34 (e.g., a positioning node), for determining the device's geographic position. In some embodiments, for example, such positioning measurements comprise timing measurements. In such a case, a wireless device 36 may measure timing differences (e.g., RSTD or Rx-TX) between different reference signals 44 received from different cells 42. These timing differences are then used to estimate the device's position with respect to the different cells 42. Of course, the above embodiments may employ any number of positioning method types besides those examples given above.

Still further, those skilled in the art will understand that the above mentioned reference signals 44 may be transmitted on the same or different frequencies across the cells 42. That is, the signals may be inter-frequency or intra-frequency. The above embodiments may therefore be implemented by wireless devices 36 that need measurement gaps to perform reference signal measurements on inter-frequency signals, as well as by wireless devices 36 that do not need such gaps. Indeed, standardized operation of a device 36 may dictate that measurement gaps be configured for such measurements, even if the device 36 is technically capable of performing the measurements without them. One such device 36 may be, for instance, a device capable of carrier aggregation.

Those skilled in the art will further appreciate that the wireless device 36 described herein may be any wireless node capable of performing measurements on reference signals 44 from multiple cells 42. In this regard, the wireless device 36 may be a mobile terminal (e.g., a smart phone, a personal digital assistant, a laptop, etc.), a sensor, a mobile relay, or even a small base station or fixed relay that performs reference signal measurements (e.g., for positioning at setup). In LTE embodiments where the measurements are utilized for positioning, for instance, the wireless device 36 comprises any LCS target.

Moreover, the above embodiments have not been described in the context of any particular type of wireless communication system (i.e., RAT). In this regard, no particular communication interface standard is necessary for practicing the present invention. That is, the wireless communication system 30 may be any one of a number of standardized system implementations in which a device 36 can perform reference signal measurements.

Nonetheless, as one particular example, the system 30 may implement LTE or LTE-based standards. In the context of positioning embodiments, therefore, the server 46 may comprise a positioning node that implements a positioning platform. If the platform is implemented in the user plane, the server 46 is an SLP node, and if the platform is implemented in the control plane, the server 46 is an E-SMLC node. Moreover, signaling of the positioning result between an E-SMLC node and an LCS Client may be transferred via multiple nodes (e.g., via MME and GMLC). Note also that LTE FDD and LTE TDD are considered as different RATs, and two LTE networks are also considered as two different LTE RATs. Finally, reference signals 44 as referred to above may comprise Positioning Reference Signals (PRS) in LTE positioning embodiments.

At least in this case, the bandwidth over which PRS are transmitted (i.e., PRS transmission bandwidth) may be made available either in a radio node in the RAN 32, a positioning node 46 in the CN 34, or another network node (e.g., O&M or SON), and then communicated between the nodes directly or via other nodes (e.g., eNodeB may communicate with positioning node via O&M). The communication may also be between eNodeBs, e.g., over X2. The communication comprises at least PRS transmission bandwidth and/or PRS measurement bandwidth and/or other PRS information (e.g., any combination of: muting information, number of subframes, PRS periodicity, PRS offset from SFN0, or e.g. pico PRS subframe offset from a macro cell in the area).

Of course, those skilled in the art will appreciate that the various "circuits" described may refer to a combination of analog and digital circuits, and/or one or more processors configured with software stored in memory 54, 66 and/or firmware stored in memory 54, 66 that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Thus, those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method of controlling the configuration of reference signals for transmission from cells in a wireless communication system, the method comprising:

identifying the cell bandwidth of each cell in a set of cells that transmit reference signals likely to be measured during a given measurement session of a wireless device;

selecting, as a function of the cell bandwidths, a reference-signal bandwidth over which reference signals are to be transmitted from at least a subset of the cells in the set; and configuring at least each cell in the subset to transmit reference signals over said reference-signal bandwidth.

2. The method of claim 1, wherein said selecting comprises calculating the reference-signal bandwidth to be the cell bandwidth of a majority of the cells in the set, wherein said subset includes those cells in the set that have a cell bandwidth greater than or equal to the reference-signal bandwidth.

3. The method of claim 1, wherein said selecting comprises identifying the subset to include those cells in the set that have a cell bandwidth greater than or equal to the reference-signal bandwidth, wherein said reference-signal bandwidth is a default bandwidth.

4. The method of claim 1, wherein said selecting comprises calculating the reference-signal bandwidth to be the minimum of the cell bandwidths, and said configuring comprises configuring each cell in the set to transmit reference signals over said reference-signal bandwidth.

5. The method of claim 1, wherein the cells in the set are served by the same class of base station in terms of the maximum transmit power of those base stations.

6. The method of claim 1, wherein the cells in the set belong to the same pre-determined tracking area, wherein the size of a tracking area defines the granularity with which the system tracks wireless devices in an idle state.

7. The method of claim 1, wherein the cells in the set transmit reference signals at one or more of the same times.

8. The method of claim 1, wherein the cells in the set are deployed in the same coverage area.

9. The method of claim 1, further comprising selecting certain cells for inclusion in the set based on those cells having a common pre-determined characteristic that indirectly indicates reference signals transmitted by those cells are likely to be measured during a given measurement session of a wireless device.

10. The method of claim 1, wherein said identifying, determining, and configuring are performed dynamically responsive to the introduction of a new cell to the system.

11. The method of claim 1, wherein the method also controls the measurement of reference signals by wireless devices, the method further comprising configuring a measurement bandwidth over which a wireless device is to measure reference signals transmitted from a cell in the subset, wherein said configuring comprises configuring the measurement bandwidth to be equal to said reference-signal bandwidth.

12. The method of claim 11, further comprising transmitting assistance data to a wireless device that includes a parameter indicating said measurement bandwidth.

13. The method of claim 1, wherein the method also controls the measurement of reference signals by wireless devices, the method further comprising configuring a measurement bandwidth over which a wireless device is to measure reference signals transmitted from a cell in the subset, wherein said configuring comprises configuring the measurement bandwidth to be equal to a serving-cell bandwidth.

14. The method of claim 13, further comprising transmitting assistance data to a wireless device that includes a parameter indicating said measurement bandwidth.

15. The method of claim 1, wherein the method also controls the measurement of reference signals by wireless devices, the method further comprising selectively re-configuring a measurement bandwidth over which a wireless device is to measure reference signals transmitted from a cell in the subset, from being equal to a serving-cell bandwidth to being equal to said reference-signal bandwidth, depending on whether or not a defined condition is met, said condition being associated with at least one of data reception quality with respect to the serving cell and reference signal measurement quality.

16. The method of claim 15, further comprising receiving a message indicating that the measurement bandwidth is to be equal to the serving-cell bandwidth and wherein said re-configuring comprises configuring the measurement bandwidth to be equal to said reference-signal bandwidth rather than the serving-cell bandwidth.

17. The method of claim 15, wherein said selective re-configuration comprises re-configuring the measurement bandwidth to be equal to said reference-signal bandwidth if said condition is met, said condition being that the wireless device will measure the reference signals with a periodicity that is longer than a defined threshold.

18. The method of claim 15, wherein said selective re-configuration comprises re-configuring the measurement bandwidth to be equal to said reference-signal bandwidth if said condition is met, said condition being that the wireless device will measure the reference signals over a number of consecutive subframes that does not exceed a defined threshold, wherein said defined threshold comprises a minimum number of consecutive subframes needed to meet defined accuracy requirements for reference signal measurements.

19. The method of claim 15, further comprising transmitting assistance data to a wireless device that includes a parameter indicating said measurement bandwidth.

20. The method of claim 1, wherein the method also controls the measurement of reference signals by wireless devices, the method further comprising:

determining, for each cell in the set, whether or not a wireless device is to measure a reference signal transmitted from that cell, based on whether or not the cell is configured to transmit that reference signal over a bandwidth smaller than or equal to a serving-cell bandwidth; and when it is determined that the wireless device is to measure at least one of those reference signals, generating and sending to the wireless device a request to perform those measurements.

21. The method of claim 1, further comprising configuring at least each cell in the subset to transmit reference signals according to the same measurement pattern, said measurement pattern comprising a pattern of low-interference subframes in which said reference signals are transmitted.

22. The method of claim 1, wherein said measurements comprise mobility measurements.

23. The method of claim 1, wherein said measurements comprise positioning measurements that are to be used for determining the geographic position of the wireless device.

24. The method of claim 1, wherein said one or more measurements comprise one or more of intra-frequency measurements, inter-frequency measurements, intra-RAT measurements, or inter-RAT measurements, wherein an inter-frequency or inter-RAT measurement comprises either an intra-band measurement or an inter-band measurement.

25. The method of claim 1, wherein the wireless communication system comprises a Long Term Evolution (LTE) system and wherein the reference signals comprise Positioning Reference Signals (PRS).

26. A network node for controlling the configuration of reference signals for transmission from cells in a wireless communication system, the network node comprising a communications interface and one or more processing circuits configured to:
- identify the cell bandwidth of each cell in a set of cells that transmit reference signals likely to be measured during a given measurement session of a wireless device;
- select, as a function of the cell bandwidths, a reference-signal bandwidth over which reference signals are to be transmitted from at least a subset of the cells in the set; and
- configure at least each cell in the subset to transmit reference signals over said reference-signal bandwidth.

27. The network node of claim 26, wherein the one or more processing circuits are configured to calculate the reference-signal bandwidth to be the cell bandwidth of a majority of the cells in the set, wherein said subset includes those cells in the set that have a cell bandwidth greater than or equal to the reference-signal bandwidth.

28. The network node of claim 26, wherein the one or more processing circuits are configured to identify the subset to include those cells in the set that have a cell bandwidth greater than or equal to the reference-signal bandwidth, wherein said reference-signal bandwidth is a default bandwidth.

29. The network node of claim 26, wherein the one or more processing circuits are configured to calculate the reference-signal bandwidth to be the minimum of the cell bandwidths, and said configuring comprises configuring each cell in the set to transmit reference signals over said reference-signal bandwidth.

30. The network node of claim 26, wherein the cells in the set are served by the same class of base station in terms of the maximum transmit power of those base stations.

31. The network node of claim 26, wherein the cells in the set belong to the same pre-determined tracking area, wherein the size of a tracking area defines the granularity with which the system tracks wireless devices in an idle state.

32. The network node of claim 26, wherein the cells in the set transmit reference signals at one or more of the same times.

33. The network node of claim 26, wherein the cells in the set are deployed in the same coverage area.

34. The network node of claim 26, wherein the one or more processing circuits are further configured to select certain cells for inclusion in the set based on those cells having a common pre-determined characteristic that indirectly indicates reference signals transmitted by those cells are likely to be measured during a given measurement session of a wireless device.

35. The network node of claim 26, wherein the one or more processing circuits are configured to perform said identifying, determining, and configuring dynamically responsive to the introduction of a new cell to the system.

36. The network node of claim 26, wherein the network node if further configured to control the measurement of reference signals by wireless devices, and wherein the one or more processing circuits are configured to configure a measurement bandwidth over which a wireless device is to measure reference signals transmitted from a cell in the subset, the measurement bandwidth being equal to said reference-signal bandwidth.

37. The network node of claim 26, wherein the one or more processing circuits are further configured to transmit assistance data to a wireless device that includes a parameter indicating said measurement bandwidth.

38. The network node of claim 26, wherein the network node also controls the measurement of reference signals by wireless devices, wherein the one or more processing circuits are configured to configure a measurement bandwidth over which a wireless device is to measure reference signals transmitted from a cell in the subset, the measurement bandwidth being equal to a serving-cell bandwidth.

39. The network node of claim 38, wherein the one or more processing circuits are further configured to transmit assistance data to a wireless device that includes a parameter indicating said measurement bandwidth.

40. The network node of claim 26, wherein the network node also controls the measurement of reference signals by wireless devices, wherein the one or more processing circuits are configured to selectively re-configure a measurement bandwidth over which a wireless device is to measure reference signals transmitted from a cell in the subset, from being equal to a serving-cell bandwidth to being equal to said reference-signal bandwidth, depending on whether or not a defined condition is met, said condition being associated with at least one of data reception quality with respect to the serving cell and reference signal measurement quality.

41. The network node of claim 40, wherein the one or more processing circuits are further configured to receive a message indicating that the measurement bandwidth is to be equal to the serving-cell bandwidth and to configure the measurement bandwidth to be equal to said reference-signal bandwidth rather than the serving-cell bandwidth.

42. The network node of claim 40, wherein the one or more processing circuits are configured to re-configure the measurement bandwidth to be equal to said reference-signal bandwidth if said condition is met, said condition being that the wireless device will measure the reference signals with a periodicity that is longer than a defined threshold.

43. The network node of claim 40, wherein the one or more processing circuits are configured to re-configure the measurement bandwidth to be equal to said reference-signal bandwidth if said condition is met, said condition being that the wireless device will measure the reference signals over a number of consecutive subframes that does not exceed a defined threshold, wherein said defined threshold comprises a minimum number of consecutive subframes needed to meet defined accuracy requirements for reference signal measurements.

44. The network node of claim 40, wherein the one or more processing circuits are further configured to transmit assistance data to a wireless device that includes a parameter indicating said measurement bandwidth.

45. The network node of claim 26, wherein the network node also controls the measurement of reference signals by wireless devices, wherein the one or more processing circuits are further configured to:
- determine, for each cell in the set, whether or not a wireless device is to measure a reference signal transmitted from that cell, based on whether or not the cell is configured to transmit that reference signal over a bandwidth smaller than or equal to a serving-cell bandwidth; and
- when it is determined that the wireless device is to measure at least one of those reference signals, generate and send to the wireless device a request to perform those measurements.

46. The network node of claim 26, wherein the one or more processing circuits are further configured to configure at least each cell in the subset to transmit reference signals according to the same measurement pattern, said measurement pattern comprising a pattern of low-interference subframes in which said reference signals are transmitted.

47. The network node of claim 26, wherein said measurements comprise mobility measurements.

48. The network node of claim 26, wherein said measurements comprise positioning measurements that are to be used for determining the geographic position of the wireless device.

49. The network node of claim 26, wherein said one or more measurements comprise one or more of intra-frequency measurements, inter-frequency measurements, intra-RAT measurements, or inter-RAT measurements, wherein an inter-frequency or inter-RAT measurement comprises either an intra-band measurement or an inter-band measurement.

50. The network node of claim 26, wherein the wireless communication system comprises a Long Term Evolution (LTE) system and wherein the reference signals comprise Positioning Reference Signals (PRS).

51. The network node of claim 26, wherein the network node is a positioning node in the wireless communication system.

52. The network node of claim 26, wherein the network node is a radio network node in the wireless communication system.

53. A wireless device configured to measure reference signals transmitted by a cell that neighbors a serving cell of the wireless device, the wireless device comprising a radio interface and one or more processing circuits configured to:

obtain assistance data that indicates a reference-signal bandwidth over which the wireless device is to measure said reference signals; and if the reference-signal bandwidth indicated in the assistance data is larger than a serving-cell bandwidth, actually measure said reference signals over the serving-cell bandwidth rather than the reference-signal bandwidth indicated in the assistance data.

54. The wireless device of claim 53, wherein the one or more processing circuits are configured to obtain assistance data by receiving the assistance data for OTDOA positioning, and wherein the reference signals comprise positioning reference signals (PRS).

55. The wireless device of claim 53, wherein the one or more processing circuits are configured to measure said reference signals over the serving-cell bandwidth rather than the reference-signal bandwidth indicated in the assistance data, if at least one of:

a predefined signal level condition is met; and a predefined condition on a measurement configuration is met.

56. The wireless device of claim 55, wherein the measurement configuration comprises at least one of:

a periodicity of said reference signals; and a number of consecutive subframes containing said reference signals in a measurement occasion.

57. The method of claim 1, wherein the cell bandwidths of at least some of the cells in the set are different.

58. The network node of claim 26, wherein the cell bandwidths of at least some of the cells in the set are different.

* * * * *